(12) United States Patent
Seo

(10) Patent No.: US 6,466,286 B1
(45) Date of Patent: Oct. 15, 2002

(54) REFLECTING SUBSTRATE FOR A LIQUID CRYSTAL DISPLAY APPARATUS INCLUDING AN ALUMINUM NEODYMIUM ELECTRODE AND MANUFACTURING METHOD THEREOF

(75) Inventor: Hyun Sik Seo, Kunpo-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/432,615

(22) Filed: Nov. 3, 1999

(30) Foreign Application Priority Data

Dec. 10, 1998 (KR) .............................. 98-54073

(51) Int. Cl.⁷ ............................................ G02F 1/1343
(52) U.S. Cl. ..................................................... 349/113
(58) Field of Search ........................... 349/42, 113, 139

(56) References Cited

U.S. PATENT DOCUMENTS

| | | |
|---|---|---|
| 5,514,909 A | 5/1996 | Yamamoto et al. |
| 5,526,149 A * | 6/1996 | Kanbe et al. ............... 349/113 |
| 5,691,782 A | 11/1997 | Nishikawa et al. |
| 5,811,835 A * | 9/1998 | Seiki et al. .................... 257/57 |
| 5,903,326 A * | 5/1999 | Lee .............................. 349/42 |
| 6,154,264 A * | 11/2000 | Koide et al. ................ 349/113 |

FOREIGN PATENT DOCUMENTS

JP  11-258  *  9/1999

OTHER PUBLICATIONS

Takayama et al, Low resistivity AI–RE (RE=La, Pr, Nd) alloy thin films with high thermal stability for thin film tranistro interconnects), J Vac Sci Technol B 14(5), 1996.*
Onishi et al, "Effects of Nd content in AI thin films on hillock formation" J Vac Sci Technol B 15(4), 1997.*

* cited by examiner

Primary Examiner—Kenneth Parker
(74) Attorney, Agent, or Firm—Birch, Stewart, Kolasch & Birch, LLP

(57) ABSTRACT

A reflectance-type liquid crystal display apparatus includes a gate electrode, a gate bus line, and a gate pad electrode which are formed on a substrate and made of AlNd. An insulating layer is disposed on the gate electrode, the gate bus line and the gate pad electrode. An AlNd reflecting electrode is disposed on the insulating layer.

25 Claims, 1 Drawing Sheet

REFLECTING SUBSTRATE FOR A LIQUID CRYSTAL DISPLAY APPARATUS INCLUDING AN ALUMINUM NEODYMIUM ELECTRODE AND MANUFACTURING METHOD THEREOF

BACKGROUND OF THE INVENTION

1. Field of Invention

The present-invention relates to a reflectance-type liquid crystal display apparatus, and more particularly, to a reflecting substrate of a reflectance-type liquid crystal display apparatus.

2. Description of the Related Art

A liquid crystal display (LCD) apparatus has been widely used as a display for a portable television and a notebook computer. Liquid crystal display apparatuses are classified into two types. One type of LCD apparatus is a transmitting-type which uses a backlight as a light source, and the other type of LCD apparatus is a reflectance-type liquid crystal display device using an external light source such as sunlight and an indoor lamp for the required light source.

It is hard to decrease the weight, the volume, the cost and the power consumption of the transmitting-type LCD because of the need to include the backlight. Accordingly, a lot of research and product development have been focused on improving the reflectance-type LCD.

Conventionally, the reflectance-type LCD uses a reflecting substrate having an uneven reflecting surface to enlarge the viewing angle range of the user.

FIG. 1 is a sectional view showing a conventional reflectance-type LCD 10, which includes a substrate 1, a gate electrode 5, a gate bus line (not illustrated), a gate pad electrode 9, a cladding electrode 6, a gate insulating layer 2, a semiconductor layer 4, ohmic contact layers 7, a source electrode 3, a drain electrode 8, a passivation layer 12, an uneven insulating layer 13, and a reflecting electrode 11.

The cladding electrode 6 is formed on the gate electrode 5, the gate bus line, and the gate pad electrode 9 which are provided on the substrate 1. The gate electrode 5, the gate bus line, and the gate pad electrode 9 are generally made of Al, which is not expensive and has a high conductivity. However, Al has a very low heat-resistance, and thereby hillocks are generated on the Al metal layer during a heat-treatment process.

The cladding electrode 6 having a highly heat-resistant metal such as Cr and Mo is formed on the electrodes of Al to prevent the hillocks. However, in this case, the manufacturing cost is increased and the manufacturing process is complicated because of need to form the cladding electrode 6.

The reflecting electrode 11 is generally made of Al having a high reflectance and a high conductivity. However, the reflecting electrode 11 must also be heat-treated and therefore also will likely have the hillock problem.

An Al alloy including the highly heat-resistant metal can be used for the reflecting electrode to prevent hillocks. However, the reflecting electrode made of Al alloy has low conductivity and low reflectance.

SUMMARY OF THE INVENTION

To overcome the problems described above, preferred embodiments of the present invention provide a reflecting substrate of a reflectance-type liquid crystal display apparatus, wherein hillocks are prevented from occuring on a reflecting electrode and a gate electrode, and the manufacturing process is simple.

According to a preferred embodiment of the present invention, a reflectance-type liquid crystal display apparatus includes a substrate, a gate electrode, a gate bus line, and a gate pad electrode which are provided on the substrate and made of aluminum neodymium, an insulating layer on the gate electrode and the gate bus line, and a reflecting electrode on the insulating layer, the reflecting electrode being made of aluminum neodymium.

Preferred embodiments of the present invention preferably are such that the gate electrode, the gate bus line, the gate pad electrode, and the reflecting electrode are formed of aluminum neodymium(AlNd).

The gate electrode, the gate bus line, and the pad electrode made of AlNd according to preferred embodiments of the present invention have a high conductivity as well as having a structure which prevents the occurrence of hillocks. The manufacturing process using AlNd for the electrodes is simple and has a low manufacturing cost in comparison with the prior art which requires the process of forming the cladding electrode to prevent hillocks.

The reflecting electrode made of AlNd according to preferred embodiments of the present invention has a high reflectance and a high conductivity while also being arranged to prevent the hillock problem.

Other features, advantages and elements of the present invention will be described in more detail below with reference to the attached drawings.

DETAILED DESCRIPTION OF PREFERRED EMBODIMENTS

Hereinafter, a reflectance-type LCD according to preferred embodiments of the present invention is described in detail referring to FIG. 2.

Figure 1:
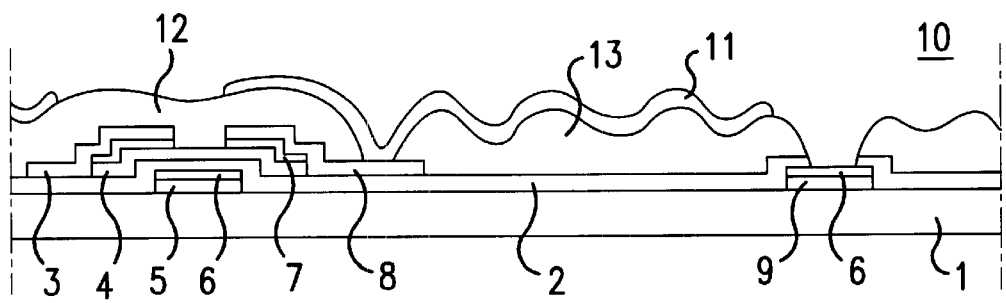
FIG. 1 is a sectional view illustrating a prior art reflecting substrate of a reflectance-type LCD.
Figure 2:
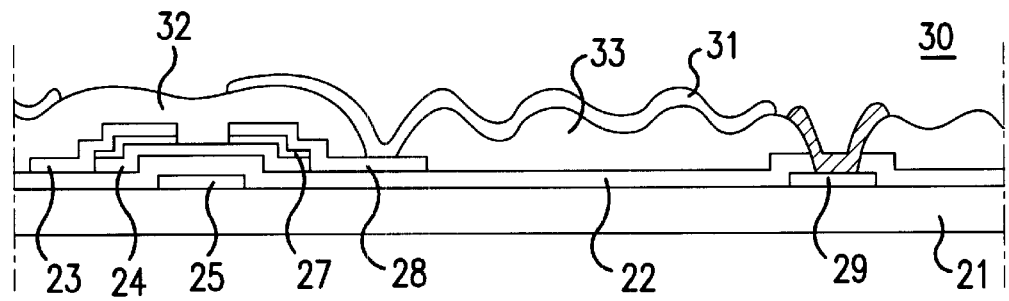
FIG. 2 is a sectional view showing a reflecting substrate of a reflectance-type LCD according to preferred embodiments of the present invention.

As shown in FIG. 2, the reflecting substrate 30 of the present invention preferably includes a substrate 21, a gate electrode 25, a gate bus line (not illustrated), a gate pad electrode 29, a gate insulating layer 22, a semiconductor layer 24, ohmic contact layers 27, a source electrode 23, a drain electrode 28, a passivation layer 32, an uneven insulating layer 33, and a reflecting electrode 31.

An aluminum neodymium (AlNd) metal layer is deposited on the substrate 21 preferably via a sputtering method, and patterned preferably via a photolithography method to form the gate electrode 25, the gate bus line, and the gate pad electrode 29.

The gate insulating layer 22 is formed thereon by depositing an inorganic layer such as SiNx and SiOx or other suitable material preferably via a chemical vapor deposition (CVD) method.

The semiconductor layer 24 is formed thereon by depositing an a-Si layer preferably via a plasma CVD method, and patterning the a-Si layer preferably via a photolithography method.

The source electrode 23, the drain electrode 28, and the data bus line are formed thereon by depositing metal such as Ti, Cr, Al, and Al alloy or other suitable metal preferably via a sputtering method, and patterning the deposited metal layer preferably via a photolithography method.

The passivation layer 32 and the uneven insulating layer 33 are preferably formed by the following method. First, a photosensitive resin layer is coated thereon preferably via a spin coating method, and UV light is irradiated with a mask blocking the photosensitive resin layer. Thereafter, the photosensitive resin layer is partially developed and heated to form the passivation layer 32 and the uneven insulating layer 33. In this process, the gate insulator 22 and the photosensitive resin layer in region of the gate pad electrode 29 are removed.

The reflecting electrode 31 is formed thereon by depositing an AlNd metal layer preferably via a sputtering method, and patterning the metal layer preferably via a photolithography method.

Although not illustrated in FIG. 2, an alignment layer may be preferably formed on the reflecting electrode 31 to determine the alignment direction of a liquid crystal layer. The alignment layer is preferably formed by coating a photo-alignment material or polyimide on the entire surface of the reflecting substrate 31, and determining the alignment direction by rubbing or photo-alignment process.

As described above, preferred embodiments of the present invention are preferably arranged such that the gate electrode 25, the gate bus line, the gate pad electrode 29, and the reflecting electrode 33 are formed of AlNd. AlNd has a high heat-resistance like other Al alloys. As a result of this unique structure, the gate electrode 25, the gate bus line, the gate pad electrode 29, and the reflecting electrode 31 can be heat-treated without generating hillocks. Further, AlNd is different from other Al alloys because AlNd has enough conductivity to be used for the electrodes 29 and 35 and the gate bus line.

Furthermore, it is possible to decrease the line width of the gate bus line made of AlNd, thereby increasing the opening ratio of the reflectance-type LCD. The manufacturing process using AlNd for the electrodes is simple and has a low manufacturing cost in comparison with the prior art methods requiring the process of forming the cladding electrode 6 to prevent hillocks.

The other Al alloys have no hillock problem, but they are not appropriate for the reflecting electrode 31 because they have a low reflectance which is liable to decrease the reflectance luminance of the reflectance-type LCD.

However, AlNd has a much higher reflectance than the other Al alloys. That is, the reflecting electrode 31 made of AlNd according to preferred embodiments of the present invention has a high reflectance as well as a high conductivity.

While the preferred embodiments of the present invention have been described, it is to be understood that modifications will be apparent to those skilled in the art without departing from the spirit of the invention. Therefore, the scope of the invention is to be determined solely by the following claims.

What is claimed is:

1. A reflecting substrate of a reflectance-type liquid crystal display apparatus, comprising:
    a substrate;
    a gate electrode on the substrate;
    an insulating layer on the gate electrode; and
    a reflecting electrode on the insulating layer, wherein each of the gate electrode and the reflecting electrode include aluminum neodymium.

2. The reflecting substrate according to claim 1, further comprising a gate bus line provided on the substrate and made of aluminum neodymium.

3. The reflecting substrate according to claim 1, further comprising a gate pad electrode provided on the substrate and made of aluminum neodymium.

4. The reflecting substrate according to claim 1, further comprising a semiconductor layer, an ohmic contact layer, a source electrode, a drain electrode, a passivation layer, and an uneven insulating layer on the substrate.

5. The reflecting substrate according to claim 1, wherein the insulating layer is made of one of SiNx and SiOx.

6. The reflecting substrate according to claim 4, wherein the semiconductor layer is made of a-Si.

7. The reflecting substrate according to claim 4, wherein the source electrode, the drain electrode, and the data bus line are made of at least one of Ti, Cr, Al, and Al alloy.

8. The reflecting substrate according to claim 1, further comprising an alignment layer on the reflecting electrode and arranged to determine the alignment direction of a liquid crystal layer.

9. A liquid crystal display apparatus, comprising:
    a substrate;
    a gate electrode on the substrate;
    an insulating layer on the gate electrode; and
    a reflecting electrode on the insulating layer, wherein each of the gate electrode and the reflecting electrode include aluminum neodymium.

10. The apparatus according to claim 9, further comprising a gate bus line provided on the substrate and made of aluminum neodymium.

11. The apparatus according to claim 9, further comprising a gate pad provided on the substrate and made of aluminum neodymium.

12. The apparatus according to claim 9, further comprising a semiconductor layer, an ohmic contact layer, a source electrode, a drain electrode, a passivation layer, and an uneven insulating layer on the substrate.

13. A method of forming a reflecting substrate of a reflectance-type liquid crystal display apparatus, comprising the steps of:
    providing a substrate;
    forming a gate electrode on the substrate;
    forming an insulating layer on the gate electrode; and
    forming a reflecting electrode on the insulating layer;
    wherein at least one of the gate electrode and the reflecting electrode is formed of aluminum neodymium.

14. The method according to claim 13, wherein each of the gate electrode and the reflecting electrode is formed of aluminum neodymium.

15. The method according to claim 13, further comprising the step of forming a gate bus line of aluminum neodymium on the substrate.

16. The method according to claim 13, further comprising the step of forming a gate pad electrode of aluminum neodymium on the substrate.

17. The method according to claim 13, further comprising the steps of forming a gate bus line and forming a gate pad electrode, wherein the step of forming the gate electrode, the gate bus line and the gate pad electrode includes the step of depositing an aluminum neodymium layer on the substrate via sputtering, and patterning the aluminum neodymium layer via photolithography method to form the gate electrode, the gate bus line, and the gate pad electrode.

18. The method according to claim 13, wherein the step of forming an insulating layer includes depositing an inorganic layer via chemical vapor deposition.

19. The method according to claim 13, further comprising the step of forming a semiconductor layer, an ohmic contact layer, a source electrode, a drain electrode, a passivation layer, and an uneven insulating layer on the substrate.

20. The method according to claim 19, wherein the step of forming the semiconductor layer includes depositing an a-Si layer via plasma chemical vapor deposition, and patterning the a-Si layer via photolithography.

21. The method according to claim 19, wherein the step of forming the source electrode, the drain electrode, and the data bus line includes depositing a metal layer including one of Ti, Cr, Al, and Al alloy via sputtering, and patterning the deposited metal layer via photolithography.

22. The method according to claim 19, wherein the step of forming the passivation layer and the uneven insulating layer includes coating a photosensitive resin layer on the substrate via spin coating, irradiating UV light while a mask blocks the photosensitive resin layer, partially developing and heating the photosensitive resin layer to form the passivation layer and the uneven insulating layer.

23. The method according to claim 13, wherein the step of forming the reflecting electrode includes depositing an AlNd metal layer via sputtering and patterning the AlNd metal layer via photolithography.

24. The method according to claim 13, further comprising the step of forming an alignment layer on the reflecting electrode.

25. The method according to claim 24, wherein the step of forming the alignment layer includes coating a photo-alignment material or polyimide on the entire surface of the reflecting substrate, and determining the alignment direction by rubbing or a photo-alignment process.

* * * * *